(12) United States Patent
Shindo et al.

(10) Patent No.: US 7,614,965 B2
(45) Date of Patent: *Nov. 10, 2009

(54) GOLF BALL

(75) Inventors: Jun Shindo, Chichibu (JP); Takahiro Hayashi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/937,799

(22) Filed: Nov. 9, 2007

(65) Prior Publication Data

US 2009/0124412 A1    May 14, 2009

(51) Int. Cl.
*A63B 37/00* (2006.01)
(52) U.S. Cl. ..................................... 473/351
(58) Field of Classification Search ................ 473/351, 473/377
See application file for complete search history.

(56) References Cited

U.S. PATENT DOCUMENTS

| | | | |
|---|---|---|---|
| 6,602,941 B2 | 8/2003 | Higuchi et al. | |
| 6,634,961 B2 | 10/2003 | Higuchi et al. | |
| 6,642,314 B2 * | 11/2003 | Sone et al. | 525/232 |
| 6,695,716 B2 | 2/2004 | Higuchi et al. | |
| 6,712,715 B2 | 3/2004 | Higuchi et al. | |
| 6,786,836 B2 | 9/2004 | Higuchi et al. | |
| 6,921,345 B2 | 7/2005 | Higuchi et al. | |
| 2006/0019771 A1 * | 1/2006 | Kennedy et al. | 473/351 |

FOREIGN PATENT DOCUMENTS

JP        2007-222196        9/2007

* cited by examiner

*Primary Examiner*—Raeann Trimiew
(74) *Attorney, Agent, or Firm*—Sughrue Mion, PLLC

(57) ABSTRACT

The present invention relates to a golf ball having a ball component made of a material molded under heat from a rubber composition which includes:

(A) from 1 to 50 parts by weight of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound, and (B) at least 50 parts by weight of polybutadiene synthesized using a rare-earth catalyst and having a stress relaxation time ($T_{80}$) of less than 4.0.

The rubber composition additionally includes the following per 100 parts by weight of ingredients A and B combined:

(C) from 10 to 50 parts by weight of an unsaturated carboxylic acid and/or a metal salt thereof,
(D) from 5 to 80 parts by weight of an inorganic filler, and
(E) from 0.1 to 10 parts by weight of an organic peroxide.

By using such a rubber composition having an improved resilience and durability as a golf ball component, the performance of the golf ball can be improved.

11 Claims, No Drawings

GOLF BALL

BACKGROUND OF THE INVENTION

The present invention relates to a golf ball in which a material molded under heat from a rubber composition serves as a ball component. More specifically, the invention relates to a golf ball having an excellent rebound and durability.

Many golf balls that use rubber compositions containing polybutadiene polymerized with a rare-earth catalyst have hitherto been described in the art. Such golf balls are disclosed in, for example, U.S. Pat. Nos. 6,695,716, 6,712,715, 6,786,836, 6,921,345, 6,634,961 and 6,602,941 (Patent Documents 1 to 6). However, there remains room for further improvement in the rebound performance of such golf balls. Moreover, sufficient performance has yet to be achieved as well in terms of manufacturability.

U.S. Pat. No. 6,642,314 (Patent Document 7) describes the use of an alkoxysilyl group-bearing compound-modified polybutadiene as a rubber composition for golf balls. JP-A 2007-222196 (Patent Document 8) discloses a polybutadiene obtained by additionally subjecting the modified polybutadiene of Patent Document 7 to a condensation reaction. However, in all of the above-mentioned prior art, there remains room for improvement in the rebound and durability of the resulting golf balls.

Patent Document 1: U.S. Pat. No. 6,695,716
Patent Document 2: U.S. Pat. No. 6.712,715
Patent Document 3: U.S. Pat. No. 6,786,836
Patent Document 4: U.S. Pat. No. 6,921,345
Patent Document 5: U.S. Pat. No. 6,634,961
Patent Document 6: U.S. Pat. No. 6,602,941
Patent Document 7: U.S. Pat. No. 6.642,314
Patent Document 8: JP-A 2007-222196

SUMMARY OF THE INVENTION

It is therefore an object of the present invention to provide a golf ball having an excellent rebound and durability.

As a result of extensive investigations to achieve the above object, the inventor has discovered that by using as a golf ball component a material molded under heat from a rubber composition that includes as essential ingredients (A) a modified polybutadiene which is obtained by modifying with at least one alkoxysilane compound the active end on a polybutadiene having a vinyl content of from 0 to 2%, a cis-1,4 bond content of at least 80% and an active end, (B) a polybutadiene synthesized using a rare-earth catalyst and having a stress relaxation time ($T_{80}$) of less than 4.0, (C) an unsaturated carboxylic acid and/or a metal salt thereof, (D) an inorganic filler and (E) an organic peroxide, golf balls having a high rebound, an increased distance and a greatly improved durability are obtained.

Accordingly, the invention provides the following golf balls.

[1] A golf ball comprising a ball component made of a material molded under heat from a rubber composition comprised of:
(A) from 1 to 50 parts by weight of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound, and
(B) at least 50 parts by weight of polybutadiene synthesized using a rare-earth catalyst and having a stress relaxation time ($T_{80}$) of less than 4.0;
and also comprised of the following per 100 parts by weight of ingredients A and B combined:
(C) from 10 to 50 parts by weight of an unsaturated carboxylic acid and/or a metal salt thereof,
(D) from 5 to 80 parts by weight of an inorganic filler, and
(E) from 0.1 to 10 parts by weight of an organic peroxide.
[2] The golf ball of [1] wherein the alkoxysilane compound has an epoxy group on the molecule.
[3] The golf ball of [1] wherein an organotin compound and/or an organotitanium compound is added as a condensation accelerator during and/or following completion of a step in which the polybutadiene modification reaction is carried out.
[4] The golf ball of (1) wherein the polybutadiene used to prepare ingredient A is polymerized using a rare-earth element-containing catalyst system.
[5] The golf ball of [3] wherein the condensation accelerator is a tin carboxylate and/or a titanium alkoxide.
[6] The golf ball of [1] wherein the rubber composition further comprises an organosulfur compound.

DETAILED DESCRIPTION OF THE INVENTION

The invention is described more fully below.

In the present invention, the rubber ingredients include (A) at least 1 part by weight but not more than 50 parts by weight of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound; and (B) at least 50 parts by weight of polybutadiene synthesized using a rare-earth catalyst and having a stress relaxation time ($T_{80}$) of less than 4.0. The alkoxysilane compound may have an epoxy group on the molecule. Moreover, an organotin compound and/or an organotitanium compound may be added as a condensation accelerator during and/or following completion of a step in which the modification reaction is carried out.

The condensation accelerator is typically added after effecting a modification reaction in which the alkoxysilane compound is added to the active end of the polybutadiene, and before the condensation reaction. However, it is also possible to add the condensation accelerator prior to addition of the alkoxysilane compound (prior to the modification reaction), then add the alkoxysilane compound and carry out the modification reaction, followed in turn by the condensation reaction.

The catalyst used when polymerizing the polybutadiene prior to the modification reaction is not subject to any particular limitation, although the use of a polymerization catalyst made up of a combination of at least one type of compound from each of the following ingredients X, Y and Z is preferred.

Ingredient X is a lanthanide series rare-earth compound of an atomic number 57 to 71 metal, or a compound obtained by reacting such a rare-earth compound with a Lewis base. Examples of suitable lanthanide series rare-earth compounds include halides, carboxylates, alcoholates, thioalcoholates, amides, phosphates and phosphites. The Lewis base can be used to form a complex with the lanthanide series rare-earth compound. Illustrative examples include acetylacetone and ketone alcohols.

Ingredient Y is an alumoxane and/or an organoaluminum compound of the formula $AlR^1R^2R^3$ (wherein $R_1$, $R^2$ and $R^3$ are each independently a hydrogen or a hydrocarbon group of 1 to 10 carbons). A plurality of different compounds may be used at the same time.

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are acceptable.

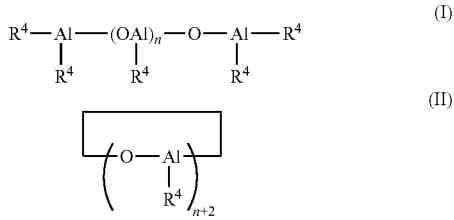

Ingredient Z is a halogen-bearing compound. Preferred examples of halogen-bearing compounds that may be used include aluminum halides of the general formula $AlX_nR_{3-n}$ (wherein X is a halogen; R is a hydrocarbon group of from 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and also silicon tetrachloride, tin tetrachloride, tin trichloride, phosphorus trichloride, titanium tetrachloride, trimethylchlorosilane, methyldichlorosilane, dimethyldichlorosilane and methyltrichlorosilane.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of a solvent, and at a polymerization temperature in a range of preferably −30° C. or above, and more preferably 0° C. or above, but preferably not above +200° C., and more preferably not above +150° C. The polymerization solvent is an inert organic solvent, illustrative examples of which include saturated aliphatic hydrocarbons having from 4 to 10 carbons, such as butane, pentane, hexane and heptane; saturated alicyclic hydrocarbons having from 6 to 20 carbons, such as cyclopentane and cyclohexane; monoolefins such as 1-butene and 2-butene; aromatic hydrocarbons such as benzene, toluene and xylene; and halogenated hydrocarbons such as methylene chloride, chloroform, carbon tetrachloride, trichloroethylene, perchloroethylene, 1,2-dichloroethane, chlorobenzene, bromobenzene and chlorotoluene.

No particular limitation is imposed on the manner in which the polymerization reaction is carried out. That is, the reaction may be carried out using a batch-type reactor, or may be carried out as a continuous reaction using an apparatus such as a multi-stage continuous reactor. When a polymerization solvent is used, the monomer concentration in the solvent is preferably from 5 to 50 wt %, and more preferably from 7 to 35 wt %. To prepare the polymer and to keep the polymer having an active end from being deactivated, care must be taken to prevent to the fullest possible degree compounds having a deactivating action (e.g., oxygen, water, carbon dioxide) from entering into the polymerization system.

In the invention, the polybutadiene having a vinyl content of from 0 to 2% and a cis-1,4 bond content of at least 80% is subjected at the active end thereof to a modification reaction with at least one type of alkoxysilane compound. It is preferable to use for this purpose an alkoxysilane compound having an epoxy group on the molecule. The alkoxysilane compound may be a partial condensation product or a mixture of the alkoxysilane compound with a partial condensation product. "Partial condensation product" refers herein to an alkoxysilane compound in which some, but not all, of the SiOR bonds have been converted to SiOSi bonds by condensation. In the above modification reaction, the polymer used is preferably one in which at least 10% of the polymer chains are "living" chains.

The alkoxysilane compound, although not subject to any particular limitation, preferably has at least one epoxy group on the molecule. Illustrative examples include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane. Of these, the use of 3-glycidoypropyltrimethoxysilane and 2-(3,4-epoxycyclohexyl)ethyltrimethoxysilane is preferred.

The alkoxysilane compound is used in a molar ratio with respect to above ingredient X of preferably at least 0.01, more preferably at least 0.1, even more preferably at least 0.5, and most preferably at least 1, but preferably not more than 200, more preferably not more than 150, even more preferably not more than 100, and most preferably not more than 50. If the amount of alkoxysilane compound used is too small, the modification reaction may not proceed to a sufficient degree, the filler may not be adequately dispersed, and the resulting golf ball may have a poor rebound. On the other hand, with the use of too much alkoxysilane compound, the resulting modified polybutadiene may have an excessively high Mooney viscosity, which may make it impossible to achieve the objects of the invention. No particular limitation is imposed on the method for adding the above modifying agent. Examples of suitable methods include adding the modifying agent all at once, adding it in divided portions, and continuous addition. Addition all at once is preferred.

The modification reaction is preferably carried out in a solution (the solution may be one which includes the unreacted monomer used at the time of polymerization). The modification reaction is not subject to any particular limitation, and may be carried out in a batch-type reactor or in a continuous system using such equipment as a multi-stage continuous reactor and an in-line mixer. It is essential that the modification reaction be carried out after completion of the polymerization reaction, but before carrying out various operations required to isolate the polymer, such as solvent removal treatment, water treatment and heat treatment.

The modification reaction may be carried out at the butadiene polymerization temperature. The reaction temperature is preferably at least 20° C., and more preferably at least 40° C., but preferably not more than 100° C., and more preferably not more than 90° C. If the temperature is low, the polymer viscosity may rise. On the other hand, if the temperature is high, the active ends on the polymer tend to lose their activity. The modification reaction time is preferably at least 5 minutes, and more preferably at least 15 minutes, but preferably not more than 5 hours, and more preferably not more than 1 hour.

In the practice of the invention, known antioxidants and known reaction terminators may be optionally added in a step following the introduction of alkoxysilane compound residues onto the active ends of the polymer.

In the present invention, in addition to the above-described modification reaction, a further alkoxysilane compound may be added. To achieve a good rebound when the composition is rendered into a golf ball, it Is preferable for this alkoxysilane compound to be an alkoxysilane compound containing a functional group (which compound is referred to below as a "functionalizing agent"). Such addition is a step which follows the above-described introduction of alkoxysilane compound residues onto the active ends of the polymer, and is preferably carried out prior to initiation of the condensation reaction. If such addition is carried out after initiation of the condensation reaction, the functionalizing agent may not uniformly disperse, which may lower the catalyst performance. Addition of the functionalizing agent is carried out preferably after 5 minutes, and more preferably after 15 minutes from initiation of the modification reaction, but preferably before 5 hours, and more preferably before 1 hour from initiation of the modification reaction.

The functionalizing agent substantially does not react directly with the active ends and remains in an unreacted state within the reaction system. Therefore, in the condensation reaction step, it is consumed in the condensation reaction with the alkoxysilane compound residues that have been introduced onto the active ends. Preferred examples of the functionalizing agent include alkoxysilane compounds having at least one functional group selected from among amino groups, imino groups and mercapto groups. The alkoxysilane compound used as a functionalizing agent may be a partial condensation product, or may be a mixture of the alkoxysilane compound with such a partial condensation product.

When a functional group-bearing alkoxysilane compound is used as the functionalizing agent in the method of modification of the present invention, the polymer having an active end reacts with the substantially stoichiometric amount of alkoxysilane compound that has been added to the reaction system, thereby introducing alkoxysilyl groups onto substantially all the chain ends (modification reaction). With the further addition of alkoxysilane compound, alkoxysilane compound residues are introduced in an amount greater than the chemically equivalent amount of active ends.

It is preferable for condensation reactions between alkoxysilyl groups to occur between a (remaining or newly added) free alkoxysilane molecule and an alkoxysilyl group on the end of a polymer chain or, in some cases, between alkoxysilyl groups on the ends of polymer chains; reactions between free alkoxysilane molecules are unnecessary. Therefore, in cases involving the fresh addition of alkoxysilane compound, it Is desirable from the standpoint of efficiency for the hydrolyzability of alkoxysilyl groups on the alkoxysilane compound to not exceed the hydrolyzability of alkoxysilyl groups on the ends of the polymer chains. For example, it is advantageous to combine the use of a compound bearing a trimethoxysilyl group, which has a large hydrolyzability, as the alkoxysilane compound employed for reaction with the active ends on the polymer, with the use of a compound containing an alkoxysilyl group of lesser hydrolyzability (e.g., a triethoxysilyl group) as the subsequently added alkoxysilane compound.

The above functional group-bearing alkoxysilane compound which may be employed as the functionalizing agent is used in a molar ratio with respect to above component X of preferably at least 0.01, more preferably at least 0.1, even more preferably at least 0.5, and most preferably at least 1, but preferably not more than 200, more preferably not more than 150, even more preferably not more than 100, and most preferably not more than 50. If the amount of use is too low, the modification reaction may not proceed to a sufficient degree, the filler dispersibility may not sufficiently improve, and the composition may have a poor resilience when rendered into a golf ball. On the other hand, if the amount of use is too high, the Mooney viscosity of the resulting modified polybutadiene may be too high.

In the present invention, it is preferable to use a condensation accelerator in order to accelerate the condensation reaction on the above-described alkoxysilane compound used as the modifying agent (and the functional group-bearing alkoxysilane compound which may be used as the functionalizing agent). The condensation accelerator used here may be added prior to the above modification reaction, although addition after the modification reaction and before initiation of the condensation reaction is preferred. When added before the modification reaction, the condensation accelerator may react directly with active ends, which may prevent alkoxysilyl groups from being introduced onto the active ends. Moreover, when added after initiation of the condensation reaction, the condensation accelerator may not uniformly disperse, as a result of which the catalytic performance may decrease. Addition of the condensation accelerator is carried out preferably after 5 minutes, and more preferably after 15 minutes from initiation of the modification reaction, but preferably before 5 hours, and more preferably before 1 hour from initiation of the modification reaction.

The condensation accelerator is preferably an organotin compound and/or an organotitanium compound. A tin carboxylate and/or a titanium alkoxide are especially preferred.

Specific examples of titanium alkoxides which may be used as the condensation accelerator include tetramethoxytitanium, tetraethoxytitanium, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, tetra(2-ethylhexyl)titanium, bis(octanedioleate)bis(2-ethylhexyl)titanium, tetra (octanedioleate)titanium, titanium lactate, titanium dipropoxybis(triethanolaminate) titanium dibutoxybis(triethanolaminate), titanium tributoxystearate, titanium tripropoxystearate, titanium tripropoxyacetylacetonate and titanium dipropoxybis(acetylacetonate).

Specific examples of tin carboxylates which may be used as the condensation accelerator include bis(n-octanoate)tin, bis(2-ethylhexanoate)tin, bis(laurate)tin, bis(naphthenate) tin, bis(stearate)tin, bis(oleate)tin, dibutyltin diacetate, dibutyltin di-n-octanoate, dibutyltin di-2-ethylhexanoate, dibutyltin dilaurate, dibutyltin malate, dibutyltin bis(benzylmalate), dibutyltin bis(2-ethylhexylmalate), di-n-octyltin diacetate, di-n-octyltin di-n-octanoate, di-n-octyltin di-2-ethylhexanoate, di-n-octyltin dilaurate, di-n-octyltin malate, di-n-octyltin bis(benzylmalate) and di-n-octyltin bis(2-ethylhexylmalate).

The amount of this condensation accelerator used, expressed as the ratio of the number of moles of the above compound to the total number of moles of alkoxysilyl groups present in the reaction system, is preferably at least 0.1, and more preferably at least 0.5, but preferably not more than 20, and more preferably not more than 10. At a molar ratio below 0.1, the condensation reaction may not proceed to a sufficient degree. On the other hand, at a molar ratio greater than 20, further effects by the condensation accelerator may not be achievable.

The above condensation reaction is carried out in an aqueous solution. It is recommended that the condensation reaction be carried out at a temperature of preferably at least 85° C., more preferably at least 100° C., and even more preferably at least 110° C., but preferably not more than 180° C., even more preferably not more than 170° C., and even more preferably not more than 150° C. The aqueous solution has a pH of preferably at least 9, and more preferably at least 10, but preferably not more than 14, and more preferably not more than 12. At a condensation reaction temperature of less than 85° C., the condensation reaction proceeds slowly and may be unable to reach completion, as a result of which the modified polybutadiene obtained may be subject to deterioration over time. On the other hand, at a temperature above 180° C., polymer aging reactions proceed, which may diminish the physical properties.

If the aqueous solution during the condensation reaction has a pH below 9, the condensation reaction will proceed slowly and may be unable to reach completion, as a result of which the modified polybutadiene obtained may be subject to deterioration over time. On the other hand, if the aqueous solution during the condensation reaction has a pH above 14, a large amount of alkali-derived components will remain within the modified polybutadiene following isolation and may be difficult to remove.

The condensation reaction is carried out for a period of preferably at least 5 minutes, and more preferably at least 15 minutes, but preferably not more than 10 hours, and more preferably not more than 5 hours At less than 5 minutes, the condensation reaction may not go to completion. On the other hand, carrying out the condensation reaction for more than 10 hours may not yield any additional effects.

The pressure of the reaction system at the time of the condensation reaction is preferably at least 0.01 MPa, and more preferably at least 0.05 MPa, but preferably not more than 20 MPa, and more preferably not more than 10 MPa.

The condensation reaction is not subject to any particular limitation, and may be carried out in a batch-type reactor or in a continuous reaction system using an apparatus such as a multi-stage continuous reactor. Also, the condensation reaction and solvent removal may be carried out at the same time.

Following the above condensation reaction, the target modified polybutadiene may be obtained by carrying out a conventional work-up.

The rubber composition of the invention includes as a rubber ingredient at least 1 part by weight, preferably at least 5 parts by weight, and more preferably at least 10 parts by weight, of the modified polybutadiene (ingredient A). The upper limit in the amount of ingredient A included is not more than 50 parts by weight, preferably not more than 30 parts by weight, and more preferably not more than 25 parts by weight. If this amount exceeds 50 parts by weight, the golf ball will have an inferior durability and rebound. On the other hand, at less than 1 part by weight, a rubber composition having the desired properties is difficult to obtain, as a result of which the objects of the invention are not attainable.

The modified polybutadiene used in the invention may be of a single type or may be a combination of two or more types.

The other rubber ingredient (B) which is used together with the modified polybutadiene is a polybutadiene synthesized using a rare-earth catalyst and having a stress relaxation time ($T_{80}$) of less than 4.0. By blending within a specific range a polybutadiene having such a small stress relaxation time ($T_{80}$) together with the modified polybutadiene of above ingredient A, the resilience of the molded rubber material is further enhanced, in addition to which its durability is also improved.

The stress relaxation time ($T_{80}$) of the foregoing polybutadiene is preferably not more than 3.5, more preferably not more than 3.0, and even more preferably not more than 2.8 The lower limit is preferably at least 1.0, and more preferably at least 1.5. At a $T_{80}$ value that exceeds the above range, the objects of the invention cannot be achieved. On the other hand, at a $T_{80}$ value lower than the above range, problems with workability may arise. This "stress relaxation time ($T_{80}$)" is defined as follows.

The stress relaxation time ($T_\lambda$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1'4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

It is recommended that the polybutadiene serving as ingredient B have a cis-1,4 bond content of at least 60%, preferably at least 80%, more preferably at least 90%, and most preferably at least 95%, and a 1,2-vinyl bond content of not more than 2%, preferably not more than 1.7%, even more preferably not more than 1.5%, and most preferably not more than 1.3%. At a cis-1,4 bond content or a 1,2-vinyl bond content outside of the above ranges, the resilience may decrease.

The use of a neodymium catalyst containing a neodymium compound to synthesize the polybutadiene serving as ingredient B is advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

Specific example of ingredient B include polybutadiene synthesized with a neodymium catalyst, such as that produced by Firestone Polymers under the trade name EC140.

The proportion of the base rubber accounted for by the above-described polybutadiene serving as ingredient B is at least 50 wt %. preferably at least 70 wt %, and more preferably at least 80 wt %. If this proportion is too low, the rebound may decrease.

Rubbers other than above ingredients A and B may also be incorporated in the base rubber. Such additional rubbers, while not subject to any particular limitation, may include polybutadiene rubbers having a stress relaxation time $T_{80}$ in excess of 4. Examples of such additional rubbers that may be incorporated include styrene-butadiene rubbers (SBR), natural rubbers, polyisoprene rubbers, and ethylene-propylene-diene rubbers (EPDM). These may be used singly or as combinations of two or more thereof.

The rubber composition of the invention includes, per 100 parts by weight of the rubber ingredients, from 10 to 50 parts by weight of (C) an unsaturated carboxylic acid and/or a metal salt thereof, (D) from 5 to 80 parts by weight of an inert filler, and (E) from 0.1 to 10 parts by weight of an organic peroxide.

The unsaturated carboxylic acid and/or metal salt thereof included as ingredient C in the rubber composition of the invention is exemplified by α,β-ethylenically unsaturated carboxylic acids and monovalent or divalent metal salts of α,β-ethylenically unsaturated carboxylic acids. Specific examples of compounds that may be used Include any one or combinations of two or more of the following:
(i) acrylic acid, methacrylic acid, itaconic acid, maleic acid, fumaric acid, crotonic acid, sorbic acid, tiglic acid, cinnamic acid and aconitic acid;
(ii) zinc, magnesium, calcium, barium, and sodium salts of the unsaturated acids in (i) above, such as zinc acrylate, zinc diacrylate, zinc methacrylate, zinc dimethacrylate, zinc itaconate, magnesium acrylate, magnesium diacrylate, magnesium methacrylate, magnesium dimethacrylate and magnesium itaconate.

The metal salt of an α,β-ethylenically unsaturated carboxylic acid serving as ingredient C may be directly mixed with the base rubber and other ingredients by a conventional method. Alternatively, an α,β-ethylenically unsaturated carboxylic acid such as acrylic acid or methacrylic acid may be added and worked into a rubber composition in which a metal oxide such as zinc oxide has already been incorporated, and the α,β-ethylenically unsaturated carboxylic acid and the metal oxide thereby made to react within the rubber composition so as to form a metal salt of the α,β-ethylenically unsaturated carboxylic acid. The crosslinking agent used may be of a single type or a combination of two or more types.

The amount of ingredient C included in the combination per 100 parts by weight of the rubber ingredients is at least 10 parts by weight, and preferably at least 15 parts by weight, but not more than 50 parts by weight, and preferably not more than 40 parts by weight. At less than 10 parts by weight, the rebound resilience of the golf ball decreases. On the other hand, at more than 50 parts by weight, the molded material is too hard, resulting in a poor durability.

An inorganic filler is added as ingredient D in order to reinforce the crosslinked rubber and thereby increase its strength. The weight of the golf ball can be suitably adjusted by the amount of such addition. Illustrative examples of the inorganic filler include zinc oxide, barium sulfate, silica, alumina, aluminum sulfate, calcium carbonate, aluminum silicate and magnesium silicate. Of these, the use of zinc oxide, barium sulfate and silica is preferred. These inorganic fillers may be used singly or as combinations of two or more thereof. The amount of inorganic filler added per 100 parts by weight of the rubber ingredients is at least 5 parts by weight, and preferably at least 10 parts by weight, but not more than 80 parts by weight, and preferably not more than 70 parts by weight. At less than 5 parts by weight, the solid golf balls obtained will be too light. On the other hand, at more than 80 parts by weight, the solid golf balls obtained will be too heavy.

The organic peroxide used as ingredient E serves as an initiator for crosslinking reactions between the rubber ingredients and the crosslinking agent, and for grafting reactions, polymerization reactions and the like. Specific examples of the organic peroxide include dicumyl peroxide, 1,1-bis(t-butylperoxy)-3,3,5-trimethyloyclohexane, 2,5-dimethyl-2,5-di-(t-butylperoxy)hexane and 1,3-bis(t-butylperoxyisopropyl)benzene. The organic peroxide is included in an amount, per 100 parts by weight of the rubber ingredients, of at least 0.1 part by weight, and preferably 0.2 part by weight, but not more than 10 parts by weight, and preferably not more than 5 parts by weight. At less than 0.1 part by weight, the molded material will be too soft, lowering the rebound resilience. On the other hand, at more than 10 parts by weight, the molded material will be too hard, resulting in a poor durability.

To further improve resilience in the present invention, it is preferable to include also an organosulfur compound. Specifically, it is recommended that an organosulfur compound such as a thiophenol, thionaphthol, halogenated thiophenol, or a metal salt of any of these be included. Suitable examples of such compounds include pentachlorothiophenol, pentafluorothiophenol, pentabromothiophenol, p-chlorothiophenol, zinc salts of pentachlorothiophenol, etc.; and diphenylpolysulfides, dibenzylpolysulfides, dibenzoylpolysulfides, dibenzothiazoylpolysulfides and dithiobenzoylpolysulfides having 2 to 4 sulfurs. Diphenyldlsulfide and the zinc salt of pentachlorothiophenol are especially preferred.

The amount of the organosulfur compound included per 100 parts by weight of the base rubber is preferably at least 0.1 part by weight, more preferably at least 0.2 part by weight, and even more preferably at least 0.5 part by weight, but preferably not more than 5 parts by weight, more preferably not more than 4 parts by weight, even more preferably not more than 3 parts by weight, and most preferably not more than 2 parts by weight. If too much organosulfur compound is included, the molded material may be too soft. On the other hand, if too little is included, an increase in the resilience is unlikely to be achieved.

In addition to the above-mentioned ingredients, the rubber composition of the invention may also optionally include lubricants such as stearic acid, antioxidants, and other additives.

The material molded under heat from a rubber composition in the invention can be obtained by vulcanizing and curing the above-described rubber composition using a method of the same type as that used on prior-art rubber compositions for golf balls. Vulcanization may be carried out, for example, at a temperature of from 100 to 200° C. for a period of from 10 to 40 minutes.

It is recommended that the material molded under heat from a rubber composition in the invention have a hardness difference, obtained by subtracting the JIS-C hardness at the center of the hot-molded material from the JIS-C hardness at the surface of the hot-molded material, of at least 15, preferably at least 16, more preferably at least 17, and even more preferably at least 18, but not more than 50, and preferably not more than 40. Setting the hardness difference within this range is desirable for achieving a golf ball having a combination of a soft feel and a good rebound and durability.

Regardless of which of the subsequently described golf balls in which it is employed, it is recommended that the material molded under heat from a rubber composition in the present invention have a deflection, when compressed under a final load of 1,275 N (130 kgf) from an initial load state of 98 N (10 kgf), of at least 2.0 mm, preferably at least 2.5 mm, and more preferably at least 2.8 mm, but not more than 6.0 mm, preferably not more than 5.5 mm, more preferably not more than 5.0 mm, and most preferably not more than 4.5 mm. Too small a deflection may worsen the feel on impact and, particularly on long shots such as with a driver in which the ball incurs a large deformation, may subject the ball to an excessive rise in the spin rate, shortening the distance traveled by the ball. On the other hand, a molded material that is too soft may deaden the feel of the ball when played and compromise the rebound, resulting in a shorter distance, and may give the ball a poor durability to cracking on repeated impact.

The golf ball of the invention includes the above-described hot-molded material as a ball component, but the construction of the ball is not subject to any particular limitations Examples of suitable golf ball constructions include one-piece golf balls in which the hot-molded material serves directly as the golf ball, solid two-piece golf balls wherein the hot-molded material serves as a solid core on the surface of which a cover has been formed, solid multi-piece golf balls made of three or more pieces in which the hot-molded material serves as a solid core on the outside of which a cover of two or more layers has been formed, thread-wound golf balls in which the hot-molded material serves as the center core, and multi-piece golf balls in which the hot-molded material serves as an intermediate layer or outermost layer that encloses a solid core. Solid two-piece golf balls and solid multi-piece golf balls in which the hot-molded material serves as a solid core are preferred because such golf ball constructions are able to exploit most effectively the characteristics of the hot-molded material.

In the practice of the invention, when the hot-molded material is used as a solid core, it is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, more preferably not more than 40.0 mm, and most preferably not more than 39.5 mm.

In particular, it is recommended that such a solid core in a solid two-piece golf ball have a diameter of at least 37.0 mm, preferably at least 37.5 mm, more preferably at least 38.0 mm, and most preferably at least 38.5 mm, but not more than 41.0 mm, preferably not more than 40.5 mm, and more preferably not more than 40.0 mm.

It is recommended that such a solid core in a solid three-piece golf ball have a diameter of at least 30.0 mm, preferably at least 32.0 mm, more preferably at least 34.0 mm, and most preferably at least 35.0 mm, but not more than 40.0 mm, preferably not more than 39.5 mm, and more preferably not more than 39.0 mm.

It is also recommended that the solid core have a specific gravity of at least 0.9, preferably at least 1.0, and more preferably at least 1.1, but not more than 1.4, is preferably not more than 1.3, and more preferably not more than 1.2.

When the hot-molded material of the invention is used as a core to form a solid two-piece golf ball or a solid multi-piece golf ball, known cover materials and intermediate layer materials may be used. Exemplary cover materials and intermediate layer materials include thermoplastic or thermoset polyurethane elastomers, polyester elastomers, ionomer resins, polyolefin elastomers, and mixtures thereof. The use of thermoplastic polyurethane elastomers and ionomer resins is especially preferred. These may be used singly or as combinations of two or more thereof. Alternatively, when a golf ball is formed with the hot-molded material in the invention serving as an intermediate layer or outermost layer enclosing a solid core, use may be made of known core materials, intermediate layer materials and cover materials.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8295 and Pandex T8290 (all manufactured by DIC Bayer Polymer, Ltd.). When an ionomer resin is used, illustrative examples of suitable commercial ionomer resins include Surlyn 6320 and Surlyn 8120 (both products of E.I. DuPont de Nemours and Co., Inc.), and Himilan 1706, Himilan 1605, Himilan 1855, Himilan 1601 and Himilan 1557 (all products of DuPont-Mitsui Polychemicals Co., Ltd.).

The cover material may include also, as an optional ingredient, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The above-described solid two-piece golf balls and solid multi-piece golf balls may be manufactured by a known method. When producing solid two-piece and multi-piece golf balls, preferred use may be made of a known method wherein the hot-molded material is placed as the solid core within a particular injection-molding mold, following which a cover material is injected over the core to form a solid two-piece golf ball, or an intermediate layer material and a cover material are injected in this order over the core to form a solid multi-piece golf ball. In some cases, production may be carried out by molding the above-described cover material under applied pressure.

It is recommended that the intermediate layer of the above solid multi-piece golf ball have a thickness of at least 0.5 mm, and preferably at least 1.0 mm, but not more than 3.0 mm, preferably not more than 2.5 mm, more preferably not more than 2.0 mm, and most preferably not more than 1.6 mm.

It is also recommended that the cover have a thickness, whether in a solid two-piece golf ball or a solid multi-piece golf ball, of at least 0.7 mm, and preferably at least 1.0 mm, but not more than 3.0 mm, preferably not more than 2.5 mm, more preferably not more than 2.0 mm, and most preferably not more than 1.6 mm.

The golf ball of the invention has dimples formed thereon and may be manufactured for competitive use by imparting the ball with a diameter and weight which conform with the Rules of Golf; that is, a diameter of at least 42.67 mm and a weight of not more than 45.93 g. It is recommended that the diameter be preferably not more than 44.0 mm, more preferably not more than 43.5 mm, and most preferably not more than 43.0 mm; and that the weight be preferably at least 44.5 g, more preferably at least 45.0 g, even more preferably at least 45.1 g, and most preferably at least 45.2 g.

As explained above, by using a rubber composition having an improved resilience and durability as a ball component in the inventive golf ball, the distance and durability of the golf ball can be improved.

EXAMPLES

The following Synthesis Examples, Examples of the invention and Comparative Examples are provided by way of illustration and not by way of limitation.

Synthesis Example 1

Preparation of Modified Polymer 1

A five-liter autoclave was flushed with nitrogen, following which 2.22 kg of cyclohexane and 280 g of 3-butadiene were added under a nitrogen atmosphere. To these was then added a catalyst prepared beforehand by reacting and aging at 50° C. for 30 minutes the following catalyst ingredients: a cyclohexane solution containing 0.081 mmol of neodymium versatate, a toluene solution containing 1.68 mmol of methyl alumoxane (abbreviated below as "MAO"), a toluene solution containing 4.67 mmol of diisobutylaluminum hydride ("DIBAH") and 0.168 mmol of diethylaluminum chloride, and 4.20 mmol of 1,3-butadiene. Following catalyst addition, polymerization was carried out at 80° C. for 60 minutes. Conversion of the 1,3-butadiene was substantially 100%.

In addition, while holding the polymer solution at a temperature of 60° C., a toluene solution containing 3.0 mmol of 3-glycidoxypropyltrimethoxysilane ("GPMOS") was added and the reaction was effected for 30 minutes. A toluene solution containing 13 mmol of tetraisopropyl titanate ("IPOTi") was then added and mixing was carried out for 30 minutes. This was followed by the addition of a methanol solution containing 1.5 g of 2,4-di-tert-butyl-p-cresol, yielding 2.5 kg of a modified polymer solution.

Next, the above modified polymer solution was added to 20 liters of an aqueous solution adjusted to pH 10 with sodium hydroxide, after which a condensation reaction was carried out together with solvent removal for 2 hours at 110° C., followed by drying on a 110° C. roller, thereby yielding a modified polymer. The modified polymer had a Mooney viscosity of 38, a cis-1,4 bond content of 92.0%. and a 1,2-vinyl content of 1.0%.

Synthesis Example 2

Preparation of Modified Polymer 2

Aside from using 3 mmol of GPMOS and using 13 mmol of bis(2-ethylhexanoate)tin (EHASn) instead of IPOTi, a modified polymer was obtained by charging the same composition and using the same polymerization method as in Synthesis Example 1. The modified polymer had a Mooney viscosity of 55, a cis-1,4 bond content of 92.0%, and a 1,2-vinyl content of 1.0%.

Golf ball cores were produced in the following examples of the invention and comparative examples using Modified Polymers 1 and 2 synthesized in the above synthesis examples. The cores are shown in Table 1.

Examples 1 to 4, and Comparative Examples 1 to 4

Rubber compositions were prepared by using a kneader to masticate the starting materials in the formulations shown in Table 1 below, then were vulcanized in a spherical mold at 170° C. for 20 minutes, thereby giving 37.7 mm diameter spherical moldings weighing 32 g. The physical properties of the moldings thus obtained were evaluated. The results are presented in Table 1 below.

TABLE 1

|  | EC 140 | BR 51 | Neocis BR 60 |
|---|---|---|---|
| Polymerization catalyst | Nd | Nd | Nd |
| Mooney viscosity | 43 | 38 | 57 |
| $T_{80}$ | 2.3 | 5.0 | 4.6 |

EC 140: Trade name for a polybutadiene (polymerized with a neodymium catalyst) produced by Firestone Polymers. $T_{80}$ value, 2.3.
BR 51: Trade name for a polybutadiene (polymerized with a neodymium catalyst) produced by JSR Corporation. $T_{80}$ value, 5.0.
Neocis BR 60: Trade name for a polybutadiene (polymerized with a neodymium catalyst) produced by Polymeri. $T_{80}$ value, 4.6.

lating body. The results are expressed as values relative to a value of "100" for the result obtained in Comparative Example 4.

Durability Index

The durability of the spherical molding was evaluated using an ADC Ball COR Durability Tester produced by Automated Design Corporation (U.S.). This tester functions so as to fire a spherical molding using air pressure and cause it to repeatedly strike two metal plates arranged In parallel. The average number of shots required for the spherical molding to crack was treated as its durability. The incident velocity against the metal plates was 30 m/s. The results are expressed as values relative to a value of "100" for the result obtained in Comparative Example 4.

As is apparent from the results in Table 2 above, which shows the rebound and durability data from the various examples as values based on arbitrary values of 100 for the rebound data and durability data obtained in Comparative Example 4, the rebound and durability in each of Examples 1 to 4 of the invention were better than the rebound and durability in Comparative Example 4. The rebound and durability values obtained in each of Comparative Examples 1 to 3 were inferior to those obtained in Examples 1 to 4 of the invention. In Comparative Example 2, a butadiene rubber corresponding to component B was used, but the amount included was less than 50 wt % of the overall amount of rubber, resulting in a poor rebound and durability. In Comparative Examples 3 and 4, a rubber other than component B of the present invention

TABLE 2

|  |  | Example |  |  |  | Comparative Example |  |  |  |
|---|---|---|---|---|---|---|---|---|---|
|  |  | 1 | 2 | 3 | 4 | 1 | 2 | 3 | 4 |
| Rubber composition | Polymer 1 | 10 |  | 20 | 10 |  | 60 | 20 | 20 |
|  | Polymer 2 |  | 10 |  |  |  |  |  |  |
|  | EC 140 | 90 | 90 | 80 | 90 | 100 | 40 |  |  |
|  | BR 51 |  |  |  |  |  |  | 80 |  |
|  | BR 60 |  |  |  |  |  |  |  | 80 |
|  | ZDA | 27 | 27 | 27 | 27 | 27 | 27 | 27 | 27 |
|  | ZnO | 18.3 | 18.3 | 18.3 | 18.3 | 18.3 | 18.3 | 18.3 | 18.3 |
|  | Antioxidant | 0.2 | 0.2 | 0.2 | 0.2 | 0.2 | 0.2 | 0.2 | 0.2 |
|  | PO-D | 0.5 | 0.5 | 0.5 | 0.5 | 0.5 | 0.5 | 0.5 | 0.5 |
|  | ZnPCTP |  |  |  | 0.1 |  |  |  |  |
| Deformation under loading (10-130 kgf) |  | 4.0 | 3.8 | 3.9 | 4.1 | 4.2 | 4.3 | 3.9 | 3.9 |
| Durability index |  | 105 | 115 | 110 | 105 | 90 | 95 | 100 | 100 |
| Rebound index |  | 100.3 | 100.4 | 100.3 | 100.5 | 100 | 99.7 | 99.9 | 100 |

Note:
Numbers given for the above rubber compositions indicate parts by weight.
ZDA: Zinc diacrylate manufactured by Nippon Shokubai Co., Ltd. under the trade name ZN-DA85S.
ZnO: Grade 3 zinc oxide available from Sakai Chemical Industry Co., Ltd.
Antioxidant: Manufactured by Ouchi Shinko Chemical Industry Co., Ltd. under the trade name Nocrac NS-6.
PO-D: Dicumyl peroxide produced by NOF Corporation under the trade name Percumyl D.
ZnPCTP: Zinc salt of pentachlorothiophenol.

Load Deformation

The deflection (mm) by the spherical molding when compressed under a final load of 1,275 N (130 kgf) from an initial load state of 98 N (10 kgf) was determined.

Rebound Index

The initial velocity was measured with an initial velocity measuring apparatus of the same type as that of the United States Golf Association (USGA)—the official golf ball reguwas used; although the amount included was at least 50 wt % of the overall amount of rubber, the rebound and durability were inferior.

The invention claimed is:
1. A golf ball comprising a ball component made of a material molded under heat from a rubber composition comprised of:
   (A) from 1 to 30 parts by weight of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound, and (B) at least 50 parts by weight of polybutadiene synthesized using a rare-earth catalyst and having a stress relaxation time ($T_{80}$) of less than 4.0;

and also comprised of the following per 100 parts by weight of ingredients A and B combined:

(C) from 10 to 50 parts by weight of an unsaturated carboxylic acid and/or a metal salt thereof, (D) from 5 to 80 parts by weight of an inorganic filler, and (E) from 0.1 to 10 parts by weight of an organic peroxide.

2. The golf ball of claim 1 wherein the alkoxysilane compound has an epoxy group on the molecule.

3. The golf ball of claim 1 wherein an organotin compound and/or an organotitanium compound is added as a condensation accelerator during and/or following completion of a step in which the polybutadiene modification reaction is carried out.

4. The golf ball of claim 1 wherein the polybutadiene used to prepare ingredient A is polymerized using a rare-earth element-containing catalyst system.

5. The golf ball of claim 3 wherein the condensation accelerator is a tin carboxylate and/or a titanium alkoxide.

6. The golf ball of claim 1 wherein the rubber composition further comprises an organosulfur compound.

7. The golf ball of claim 1, wherein the stress relaxation time is a measurement of the time in seconds that is required for a Mooney viscosity value of element (B) to decrease 80%.

8. The golf ball of claim 1 wherein the amount of the modified polybutadiene as the component (A) is at least 1 part by weight but not more than 25 parts by weight.

9. The golf ball of claim 1 wherein the material molded under heat has a hardness difference, obtained by subtracting the JIS-C hardness at the center of the hot-molded material from the JIS-C hardness at the surface of the hot-molded material, of at least 15 but not more than 50.

10. The golf ball of claim 1 wherein the material molded under heat has a deflection, when compressed under a final load of 1,275 N (130 kgf) from an initial load state of 98 N (10 kgf), of at least 2.0 mm but not more than 6.0 mm.

11. The golf ball of claim 1 wherein the material molded under heat is used as a core to form solid multi-piece golf ball and a cover material of the golf ball is thermoplastic polyurethane elastomers.

* * * * *